July 5, 1955

P. WESTFALL 2,712,370

CLUTCH AND BRAKE CONTROL MECHANISM

Filed April 14, 1951

INVENTOR.
Paul Westfall
BY
Atty.

July 5, 1955 P. WESTFALL 2,712,370
CLUTCH AND BRAKE CONTROL MECHANISM
Filed April 14, 1951 6 Sheets-Sheet 6

INVENTOR.
Paul Westfall
BY
Atty.

2,712,370

CLUTCH AND BRAKE CONTROL MECHANISM

Paul Westfall, Portland, Oreg.

Application April 14, 1951, Serial No. 221,112

4 Claims. (Cl. 192—17)

This invention relates to a direction control mechanism having particular utility in steering the movements of either a track-laying or a nondirigible wheeled tractor. That is, my invention is directed to vehicles in which steering is effected by applying or disconnecting power to the separate ground-engaging wheels rather than by adjusting the axis of rotation thereof, as in automobiles. More specifically, this invention provides a concentric clutch and brake mechanism joined to the drive shaft or axle on each side of a tractor in combination with a central steering column for controlling the clutch and brake actuation. Thus, the tractor is steered by manipulating the steering column, sequentially and selectively, to disengage a chosen clutch and apply the corresponding brake.

The modern tractor, whether it be of the track-laying or the nondirigible wheeled type, is a basic work tool in many diverse industries and operations. For example, this tool is employed by the logging industry to build access roads, clear camp and log assembly areas, and to snake and load logs; by the construction industry to clear land, build roads, provide an auxiliary source of power and, in general, to accomplish various earth-moving functions; by the military in amphibious landing operations, airfield and gun emplacement construction, and tank, tank destroyer and truck retrieving operations; and by planters, harvesters, and other agricultural operators to haul heavy loads, plow, plant, harvest and, in general, to provide a primary power source. To meet these diverse work requirements, a variety of accessories or secondary work tools are combined with the tractor per se. Thus, a bulldozer blade, blade tilt mechanism, wheeled arch, trailer, power winch, and a diverse array of agricultural and construction implements commonly may be mounted upon or hauled by the tractor. It is the increased use of such accessories and the complex operational or control problems born thereof which has given rise to the need for my invention. Accordingly, a prime object of this invention is to simplify and unify, so far as possible, the steering and control of those tractors which do not have dirigible wheels.

Turning now to the conventional or prior art tractor of the aforementioned nondirigible type, steering commonly is effected by a braking and/or clutching mechanism. To this end, a separate brake and clutch is provided for each track or for each ground-engaging portion of the tractor. In addition, a separate pedal or lever is provided for the control of each brake and each clutch, a total of four levers and pedals normally being required. As this tractor moves over the ground, either a wider or a sharp turn may be made. To effect a shallow turn, the driver kicks or depresses one of the pedals or pulls one of the levers to disengage the clutch controlling one track or one ground-engaging portion. This causes the other track to move ahead at an increased relative speed and to turn the tractor slowly to one side. To effect a more sharp turn, the driver actuates a second pedal or lever also to apply the brake controlling the same side of the tractor. This completely stops one track or ground-engaging portion and pivots the tractor sharply thereabout.

The conventional tractor steering mechanism, above described, is possessed of two prime disadvantages, one inherent and one extrinsic, which it is the object of my invention to eliminate. The inherent disadvantage becomes acute as more numerous and diverse accessories or secondary work tools add to the control complexities confronting the driver. For example, while cutting a level road in the face of a slope with a tractor equipped with a tiltable bulldozer blade, the driver not only must manipulate the four direction control pedals and levers, he also must manipulate the separate blade leveling and blade raising or lowering pedals and levers. Efficiently and correctly to correlate the manipulations of all these controls requires a skill possessed by a limited few. Accordingly, one object of my invention is to provide a unitary central control column which will, sequentially and automatically, correlate the four direction control components of a tractor steering operation. To this end, my control column selectively will actuate an individual clutch or a combination clutch and brake by the manipulation of but one, centrally located, steering wheel, thereby freeing the driver's feet, arms, and mind for attention to the accessory controls.

The second prior art disadvantage, which I have termed extrinsic to the prior art control structure per se, is most evident when an unskilled or careless driver is employed. Thus, many drivers, when called upon to effect a shallow turn, will apply one of the brakes rather than disengaging one of the clutches. This results in undue wear and heating of the brake since the tractor is pulling while the brake is applied. The consequent reduction in brake life is a disadvantage not lightly to be dismissed. Accordingly, within the scope of my invention, it is a further object to provide a tractor control which requires, positively, that a shallow turn be effected by disengaging one of the clutches rather than by applying one of the brakes. Thus, even an unskilled or careless driver cannot overload, overwork, or overheat the brake mechanisms.

In summary, the direction control mechanism of my invention includes a concentric clutch and brake mechanism for each of the track or ground-engaging portions of a tractor. Each clutch and each brake is pressure actuated through a fluid pressure conduit. Each such conduit, in turn, carries a separate control valve and all of these valves are arranged centrally about the periphery of a steering column. In addition, two eccentric cams or cam surfaces are carried by the steering column in engagement with the control valve stems. By properly positioning the high and low cam surfaces with respect to the peripheral location of each valve stem, a simple rotation of the control column, sequentially, can be made to disengage a given clutch and apply the corresponding brake. Thus, the driver need give but a minimum of attention to steering the tractor, a slight turn to one side being correlated, automatically, to a slight turn of the steering column in the same direction. Similarly, a sharp or full turn to one side is correlated to a sharp turn of the column. Yet further, because the clutch control valves and cam surfaces always are actuated before the brake control valves and cam surfaces, no undue strain or overload can be impressed upon the brake mechanism even an apprentice being required, positively, to effect the correct sequence of clutch and brake action.

From the above summary description, other advantages can be seen to flow from my invention. Thus, one object of my invention is to provide a pressure actuated, concentric clutch and brake mechanism of novel design. This concentric mechanism includes a brake drum and a brake band which surrounds and encompasses the clutch mechanism. This provides a material saving in weight, critical material, and complex operating mechanism, and, at the same time, provides a material increase in strength and operating efficiency. In addition, I have found a further advantage to flow from such a concentric clutch and brake structure. This advantage is one of heat dissipation from the brake, conventionally a major problem to the continued braking efficiency of large tractors. Toward the attainment of this advantage, I prefer to join my brake drum to the periphery of the clutch mechanism with a novel radial expansion device which includes a plurality of air cooling vents. In my preferred embodiment, this expansion and cooling device takes the form of a mated tooth and socket structure in which the sockets are oversized or enlarged with respect to the teeth and in which each mated structure is spaced circumferentially from adjacent structures by an air cooling vent. Thus, heat generated in the brake drum during normal operation is anticipated and dissipated. It is anticipated and rendered harmless by the oversize sockets which allow the drum to expand radially with respect to the clutch while maintaining the operative engagement of the clutch and drum. On the other hand, the heat is dissipated by the air cooling vents which lie directly adjacent the inner face of the brake drum and which are allowed to breathe through a novel duct system in the deck of the tractor.

Yet another advantage of my invention flows from the provision of a fluid pressure actuation mechanism for each brake and for each clutch. This fluid pressure mechanism amplifies the physical force exerted by the driver during a braking and clutching operation. Furthermore, this mechanism allows the control column to be located distantly from the brake and clutch mechanism, this amplification and distant location being essential to the efficient control of massive, powerful tractors.

Accordingly, another object of my invention is to provide a concentric clutch and brake mechanism having a common axis of rotation and a distantly located fluid pressure control mechanism, thereby to attain the above noted advantages.

Yet another object of my invention is to provide a novel radial expansion and air cooling duct structure for use with a concentric clutch and brake mechanism, whereby heat is anticipated, dissipated, and rendered harmless.

These and other objects and advantages of my invention are set forth in the following detailed description, in which reference is had to the accompanying drawings, wherein.

Figure 1:
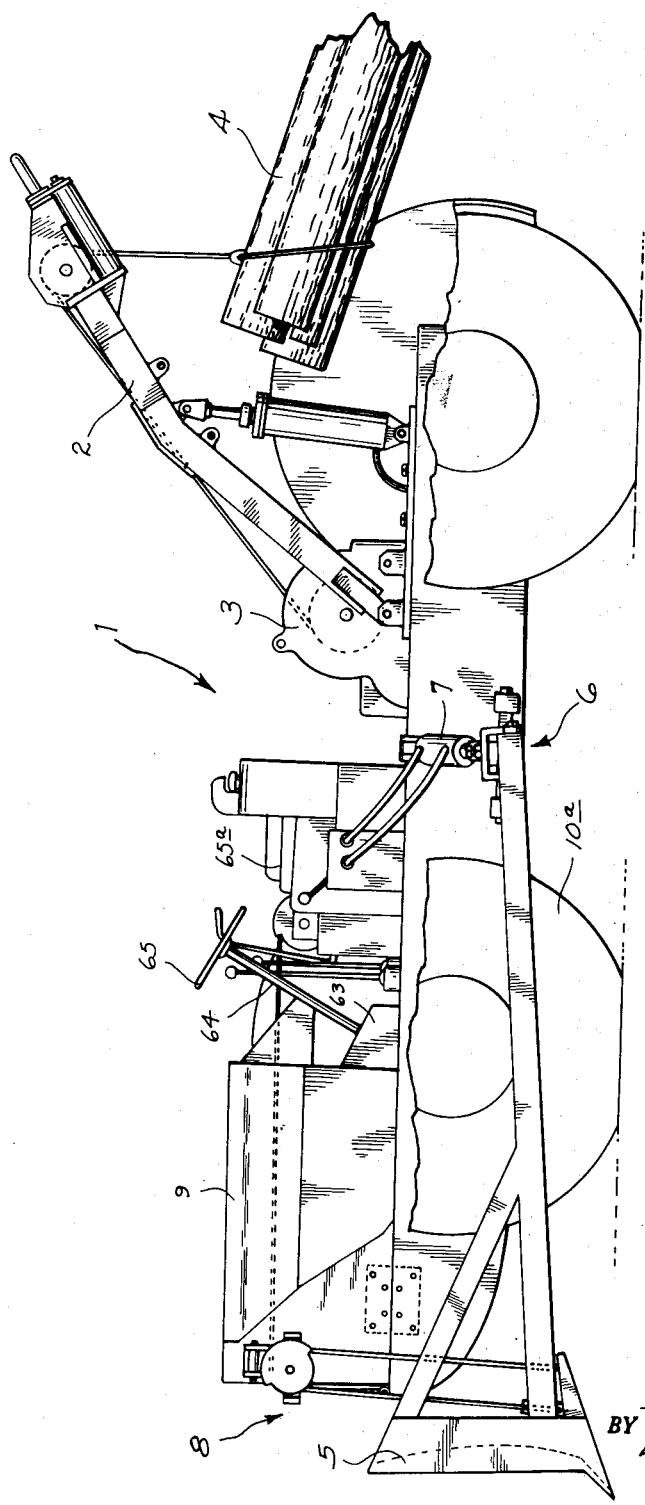
Fig. 1 is a side view showing a nondirigible wheeled tractor embodying the features of my invention and carrying a bulldozer blade, power winch, and pivoted arch better to illustrate the complex control problems bottoming the need for my invention.

While I have chosen to illustrate and describe the preferred embodiment of my invention in combination with a nondirigible wheeled tractor 1, it will be obvious that the invention is equally as practical in combination in any track-laying or cleat-type tractor. If desired, the tractor 1 may carry a pivoted arch 2 and a power winch 3 to haul a log 4 or other load. This pivoted arch and the mounting therefor form no part of the instant invention. However, the details thereof are fully disclosed in my copending application Serial No. 221,110, filed April 14, 1951, now Patent No. 2,691,451, patented Oct. 12, 1954 and entitled Articulated Arch for Tractor.

As a further accessory or secondary work tool, the tractor 1 may carry a bulldozer blade 5 which is mounted pivotally on the sides of the tractor as at 6 and which is tiltable about an axis parallel to the longitudinal axis of the tractor by a fluid pressure mechanism 7. Again, this pivot and tilt mechanism forms no part of the instant invention. However, the details thereof are fully disclosed in my copending application Serial No. 221,109, filed April 14, 1951, and entitled Bulldozer Blade Arm Mounting.

Many conventional tractors employ a hydraulic motor mechanism to raise and lower the blade 5, whereas others employ a cable and pulley mechanism to effect the same function. In conjunction with the instant invention, either type mechanism may be employed. However, I have illustrated a cable-and-pulley type mechanism 8 which is mounted directly upon the hood of the tractor 9 in accord with the invention disclosed in my copending application Serial No. 221,111, filed April 14, 1951, and entitled Hood Mount and Hoist Mechanism for Bulldozer Blade.

The details of the instant invention are best described with reference to the schematic drawing of Fig. 3. Thus, each of the wheels 10a of the tractor 1 is fixed to a drive shaft 10 to define a nondirigible tractor. That is to say, the wheels 10a cannot pivot about a vertical axis to steer the tractor as do the front wheels of the conventional automobile or truck. With a tractor, either of this type or of the track-laying type, it is conventional to steer or control the tractor by clutching and/or braking the shafts 10. For example, if power is applied to the right shafts 10 while the clutch controlling the left shafts is disengaged, the tractor will turn to the left. During this movement, however, the four wheels, 10a or the two tracks of the tractor remain both parallel one with another and perpendicular to the respective axles. This nondirigible type structure provides a much more rugged drive and support mechanism.

Within the scope of my inventive concept, the clutching and steering best is accomplished through the medium of a left hand and a right hand concentric clutch and brake mechanism 11 and 12, respectively. As shown in Fig. 3, each of these concentric clutch and brake mechanisms lies intermediate and is operatively joined to a main drive shaft 13 and a corresponding one of the shafts 10, the clutch portion being designated 11a or 12a and the brake portion 11b or 12b. Furthermore, the brakes 12b and 11b and the clutches 12a and 11a all are fluid pressure actuated through a series of pressure conduits, control valves, and a central control column. Fluid pressure, to actuate this mechanism, best is derived from a storage or supply tank 14, all as will be described hereinafter.

Since the left and right hand brake and clutch mechanisms 11 and 12 are allochiral, a detailed description of the concentric mechanism 11 will suffice. Thus (see Figs. 3 and 4), a pinion 15 is fixed to the main drive shaft 13 in operative engagement with a bevel gear 16. This bevel gear, in turn, is fixed to a flange 17 carried by the main cross shaft or drive shaft 18 through the medium of a plurality of bolts 19. The main cross shaft 18 is journaled on a plurality of cylindrical roller bearings 20 and is fixed, by means of a key 21, to a rotary transfer flange 22. The transfer flange 22, in turn, is pierced by the studs 23 to secure the driving ring element 24 of the friction clutch 11a thereto. Thus, the driving ring 24 is mounted for rotation with the main cross shaft 18 but is fixed against longitudinal movement along said cross shaft.

As is conventional with a multiple disk clutch, a plurality of circular, driving friction disks 25 is fixed to the periphery of the driving ring 24 for rotation therewith. A similar plurality of circular driven friction disks 26 is interposed between alternate ones of the driving friction disks 25 and fixed to a driven spider member 27 for rotation therewith. Thus, when the driving and driven friction disks 25 and 26, respectively, frictionally are engaged one with another, the spider 27 and the ring 24 rotate together, and the clutch 11a is engaged. Similarly, when the driving and driven friction disks are spaced slightly, one from another, the clutch 11a is disengaged and relative rotation can take place between the spider 27 and the ring 24. In general, the driving friction disks 25, the transfer flange 22, the driving ring 24, and the main cross shaft 18 rotate together and are termed the driving elements of the clutch 11a.

Figure 4:
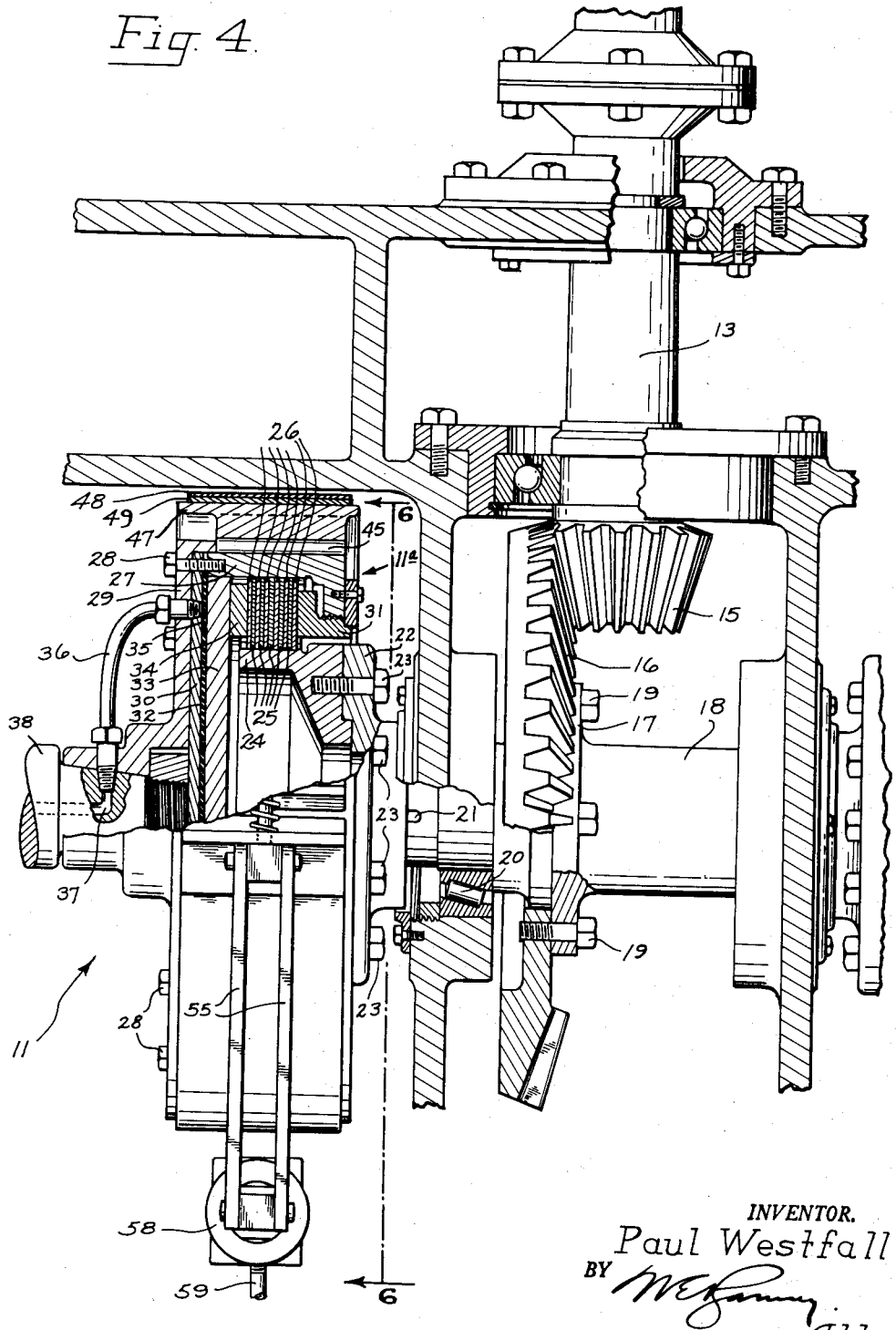
Figs. 4 and 5 are related detail views, partially broken away, showing the drive shaft and driven shaft at one side of my tractor together with the concentric clutch and brake mechanism selectively for interconnecting and/or braking one or both of these shafts.

As shown in Fig. 4, a plurality of studs 28 are utilized to fix a casing flange member 29 and a cylinder end wall plate 30 to the driven spider 27 for rotation therewith. In addition, a threaded backing ring 31 is fixed to the spider 27 for rotation therewith. Thus, the driven friction disks 26, the driven spider member 27, the studs 28, the casing flange member 29, the end wall plate 30, and the threaded backing ring 31 are fixed one to another for rotation together about the common axis of rotation of the concentric mechanism. In general, I term these parts the driven elements of the clutch 11a.

Referring now to the manner in which the driving and driven friction disks 25 and 26 are fluid pressure actuated, I have provided a flexible "fairprene" or rubber disk 32 which, together with the cylindrical end wall plate 30, defines a fluid pressure motor. This flexible disk, in turn, bears upon a movable piston plate 33 having engagement with a bumper ring 34. Intermediate the flexible disk 32 and the end wall plate 30, I interpose the port 35 of a fluid pressure supply and exhaust conduit 36. Thus, when pressure fluid is supplied through the conduit 36, the flexible disk 32 moves the piston plate 33 and the bumper ring 34 laterally along the axis of the main cross shaft 18 frictionally to engage the driving and driven disks 25 and 26, respectively. On the other hand, when pressure fluid is exhausted through the conduit 36, the friction disks 25 and 26 spring apart to disengage the clutch.

Figure 5:
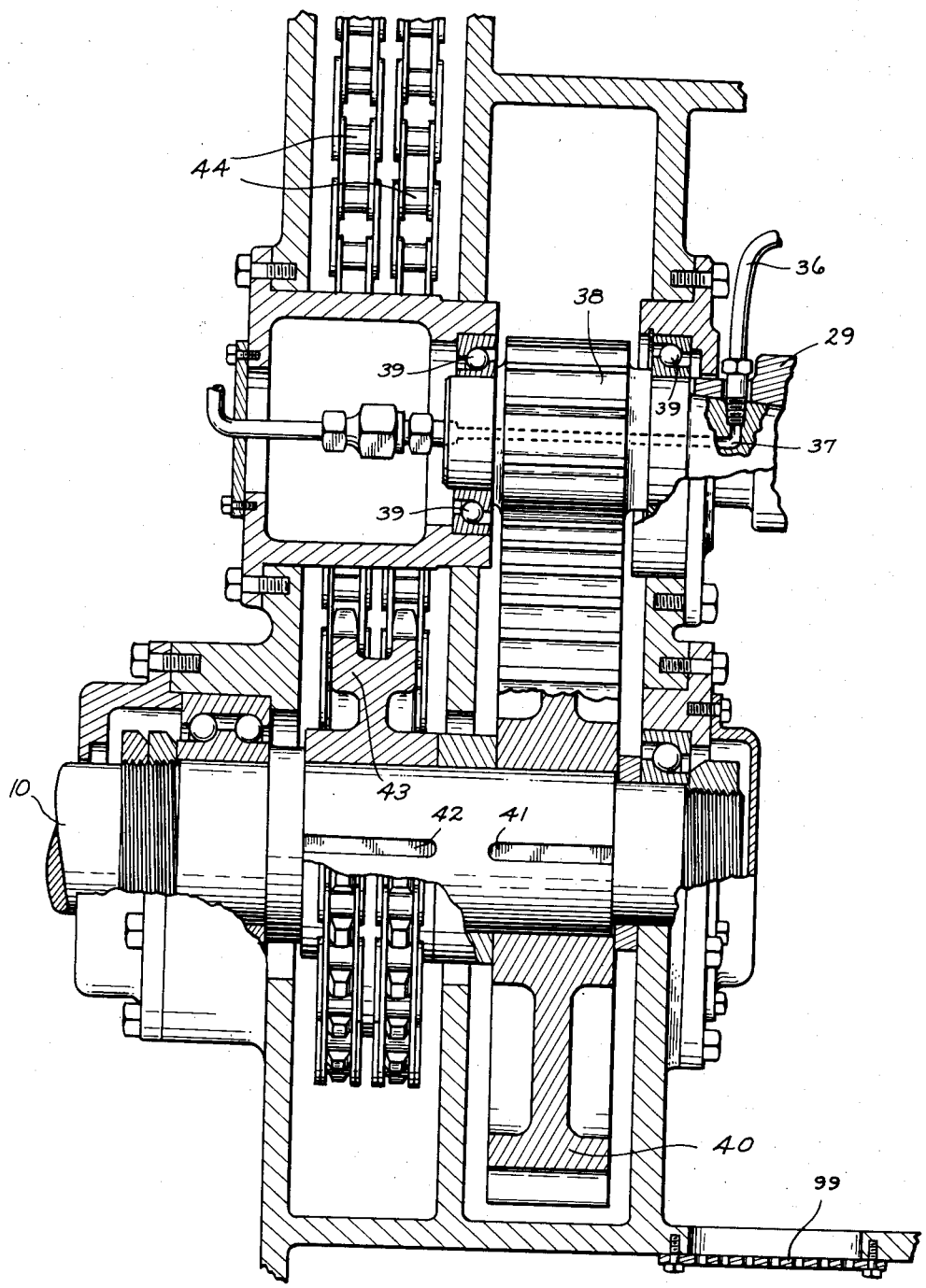

Reference to Figs. 4 and 5 will disclose that these two figures are drawn to the same relative scale and one figure is a continuation of the other. Thus, both figures indicate the manner in which the fluid pressure conduit 36 radially pierces the casing flange member 29 to communicate with a pressure transfer bore 37. This transfer bore 37, in turn, axially is aligned both with the axis of rotation of the clutch 11a and with the axis of rotation of the pinion 38 through which the conduit is formed. The pinion 38 is journaled for rotation, as on the bearings 39, and is meshed with a large spur gear 40. The large spur gear 40, in turn, is keyed to the left rear shaft 10, as at 41, to impart rotation thereto. A second key 42 is utilized to fix a main drive sprocket 43 to the aforementioned shaft 10. This drive sprocket, in turn, rotates a dual chain drive 44 articulating anteriorly with a similar sprocket carried by the left front shaft 10. Thus, when the clutch friction disks 25 and 26 are engaged, rotation is imparted to the casing flange member 29, the pinion 38, the large spur gear 40, and the left front and rear wheels 10a on the left front and rear shafts 10. This causes the front and rear nondirigible wheels 10a to rotate at the same speed and, in effect, provides a four-wheel drive for the preferred embodiment of my invention.

Figure 6:
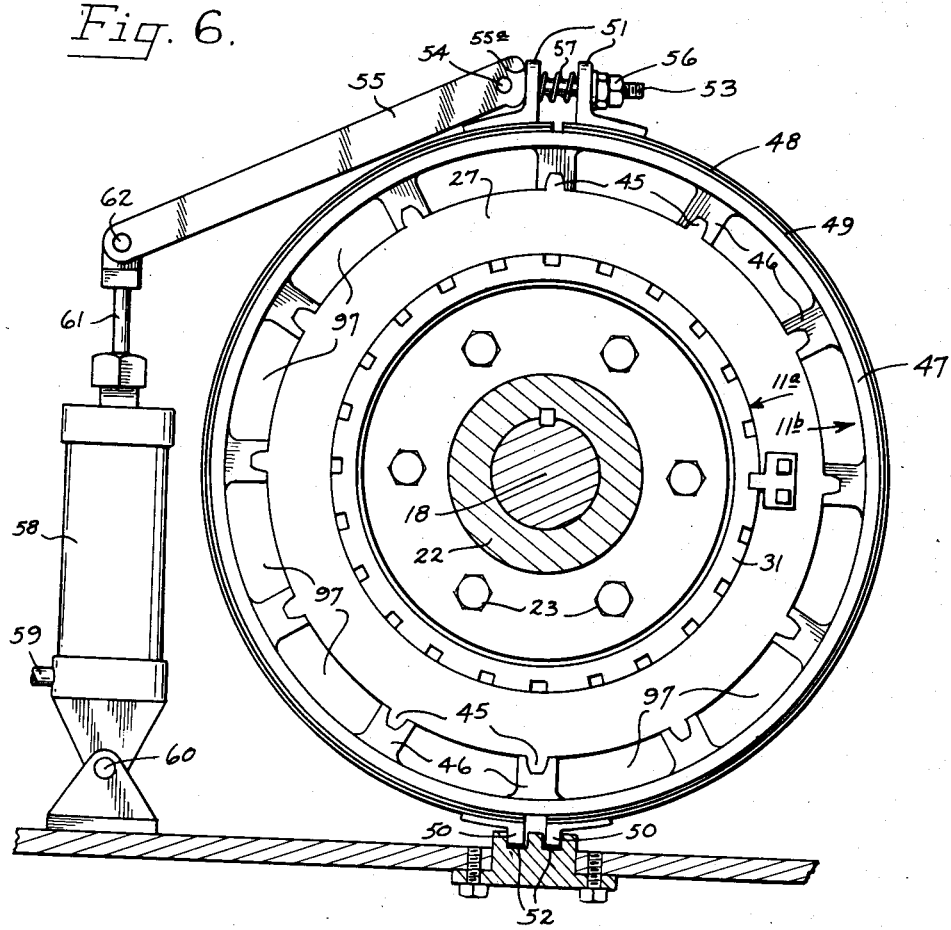
Fig. 6 is a detail view, taken substantially on the line 6—6 of Fig. 4, better indicating the mated toothed and socket elements and the axial air cooling ducts provided for the concentric clutch and brake mechanism.

Referring now to the brake portion 11b of my concentric clutch and brake mechanism 11, Figs. 4 and 6 are of particular pertinence. As therein shown, a plurality of teeth 45 are spaced about the periphery of the driven spider member 27. Each of these teeth, in turn, is mated with a corresponding socket member 46 carried on the inner periphery of a brake drum 47. Each of the sockets 46 is slightly oversize with respect to its mated tooth 45 to accommodate relative radial expansion between the parts of the brake 11b and the clutch 11a. Thus, when the brake drum 47 generates heat during normal use, the mated tooth and socket structures allow the brake drum 47 to expand radially with respect to the spider 27. During this radial expansion, however, the spider 27 and brake drum 47 remain, at all times, in operative engagement for rotation one with another. Obviously, such engagement is essential to retain control of the tractor.

Encompassing the periphery of the brake drum 47, I have shown a two-piece brake band 48 carrying a two-piece brake lining 49 on the inner face thereof in conventional manner. The lower ends of the brake band 48 are made integral with a first pair of ears 50 for engagement in a pair of mated anchor pockets 52 secured to the frame of the tractor. Similarly, the upper halves of the brake band are made integral with a second pair of ears 51 having a pin 53 mounted slidably in a pair of aligned apertures formed therethrough. The pin 53 is joined at one end, as by the pivot 54, to a dual cam actuation rod 55 carrying a cam face 55a. The other end of the slidable pin 53 accommodates a nut 56 having bearing engagement with the outer face of the right hand ear 51. Intermediate the second pair of ears 51, a compression spring 57 is interposed to bias the brake band halves 48 into the brake release position.

To move the two halves of the brake band 48 together and, thereby to apply the brake 11b, I prefer to utilize a hydraulic or air fluid pressure motor 58. Fluid pressure is supplied to and exhausted from this air motor via a pressure conduit 59 and the end of the motor is joined pivotally to the frame of the tractor as at 60. In Fig. 6, the piston rod 61 of the motor 58 is shown joined to the dual cam actuation rod 55 by means of a pivot link 62. Thus, when fluid pressure is supplied to the motor 58, the piston rod 61 pivots the dual cam rod 55 and the cam face 55a to force the ears 51 toward one another against the spring bias force. This movement, in turn, causes the halves of the brake band 48 more closely to encompass the brake drum 47 to apply the brakes and slow or stop both of the left hand wheels 10a. Similarly, this braking action slows or stops the driven elements of the clutch, since these elements are fixed to the brake drum 47 by means of the aforementioned tooth and socket structure.

Figure 2:
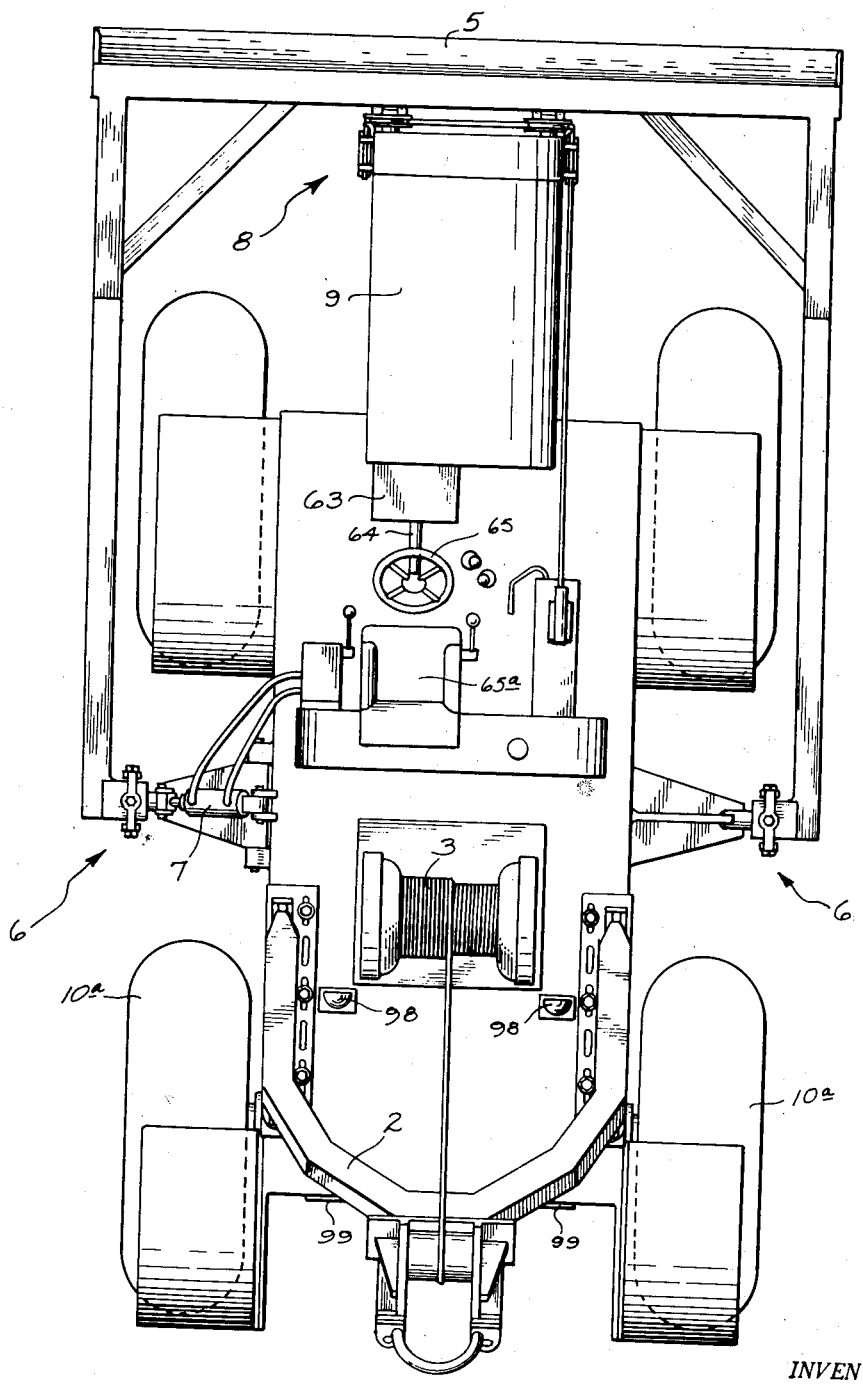
Fig. 2 is a top view of the tractor shown in Fig. 1 better indicating the manner in which my central control column and steering mechanism is located distantly from the ground-engaging portions of the tractor for easy access by the driver.

Turning now to the novel air cooling duct structure with which I dissipate heat from the inner face of the brake drum 47, it will be seen that the tooth and socket elements 45, 46 are spaced peripherally one from another (see Fig. 6). Accordingly, this spacing provides a plurality of axial air ducts 97. These air ducts are bounded peripherally between spaced ones of the tooth and socket elements and are bounded radially between the brake drum 47 and the driven spider 27 to provide a uniform cooling action over all these elements. Referring now to Figs. 2, 4, and 5, it will be seen that the clutch and brake mechanism 11 is aligned longitudinally with a plurality of air intake scoops 98 formed in the after deck of the tractor and with an air exit screen 99 formed in the rear frame of the tractor. Thus, as the tractor moves over the ground, cooling air is forced in through the scoops 98, circulated through the air ducts 97, and sucked out through the exit screen 99. In this manner, heat is dissipated and the operative life of the clutch 11a and brake 11b materially is prolonged.

Figure 3:
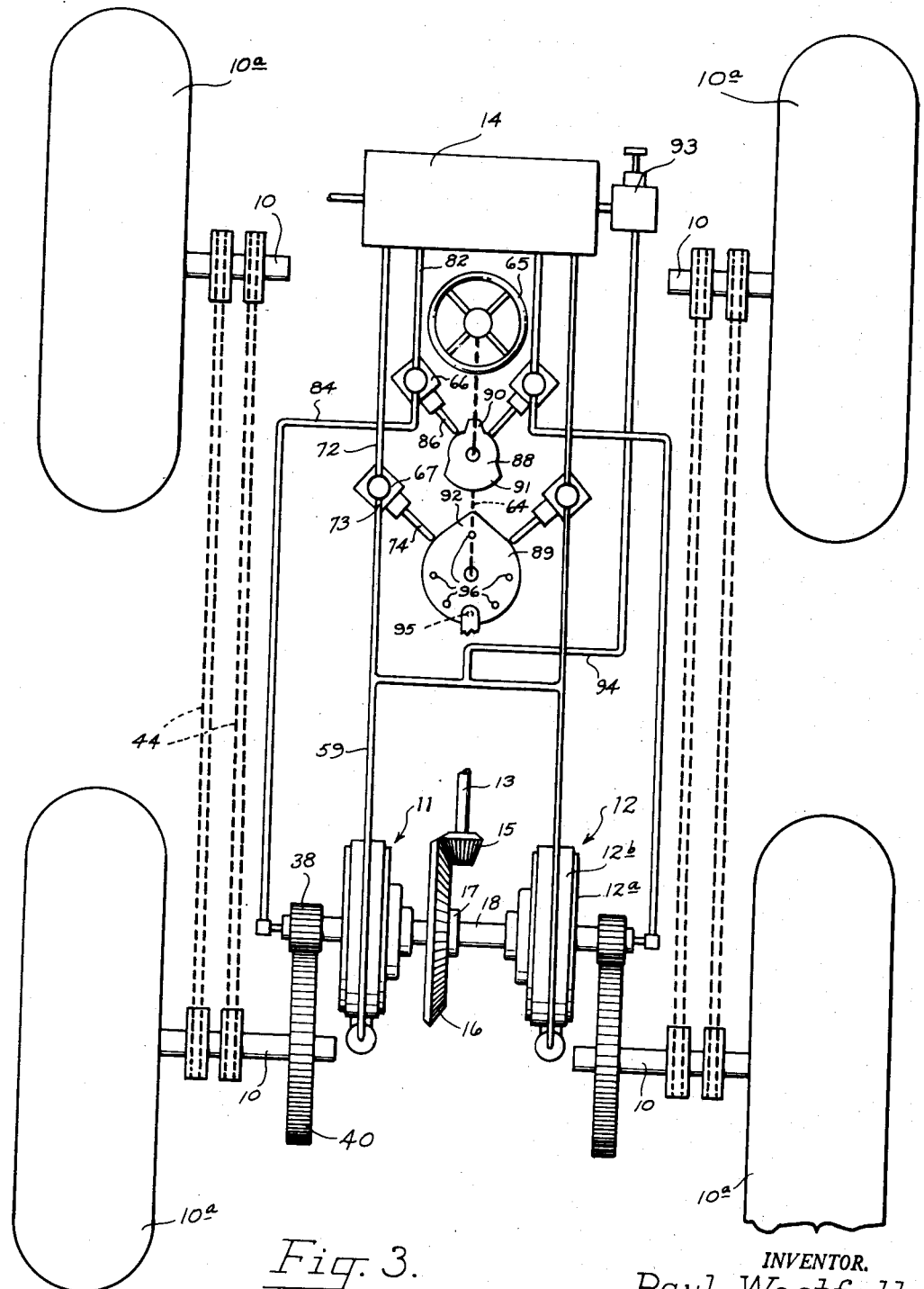
Fig. 3 is a schematic drawing correlating the location of my central control column, eccentric cam surfaces, fluid pressure conduits, control valves, and concentric clutch and brake mechanism.

Turning now to the schematic drawing of Fig. 3, I will explain the details of my novel direction control mechanism, by means of which the four separate pedals and levers of the conventional tractor steering mechanism are correlated and replaced by a unitary steering column. In this figure, I have shown the elements of the control mechanism broken away and spaced somewhat better to illustrate the operation thereof. In actual practice, however, the cam and valve elements of this mechanism will be inclosed within a control box 63 (see Figs. 1 and 2) at the base of a central control column 64. This control column 64 is mounted for rotation and carries a steering wheel 65 located directly in front of the driver's seat 65a.

Figures 7, 8:
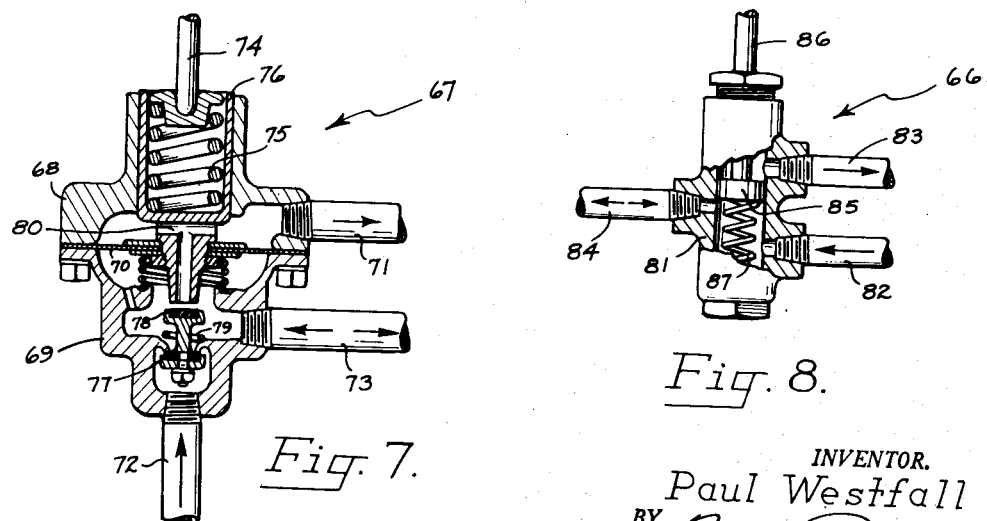
Figs. 7 and 8 are detail views of a brake control valve and a clutch control valve, respectively, of the type which may be utilized with my novel control mechanism.

As before mentioned, a fluid pressure storage or supply tank 14 is provided to supply fluid pressure to the clutch control conduit 36 and the brake control conduit 59. The flow of pressure through these conduits, respectively, is controlled by a clutch valve 66 and a brake valve 67, reference being had only to the left hand elements since the right hand elements are allochiral. I have shown the details of a preferred embodiment for these valves in Figs. 8 and 7, respectively. In practice, one set of these clutch and brake valves controls the ground-engaging portion on the right side of the tractor while a second, similar set controls the left side of the tractor.

The brake control valve 67 (see Fig. 7) comprises an upper casing member 68 and a lower casing member 69 which, together with the flexible diaphragm 70, divide the valve housing into two chambers. The upper valve chamber communicates, via an exhaust port 71, with the atmosphere if the pressure control fluid is air. If this control fluid is oil, the port 71 will communicate with a return conduit leading to a pump or reservoir. Similarly, the lower valve chamber communicates with an inlet port 72 and with a motor port 73. As shown in Fig. 3, the motor port 73 is joined to the aforementioned brake control conduit 59. Actuation of the valve 67 is effected by means of a reciprocable valve stem 74 which bears on a spring 75 held within a slidable retaining cup 76. In addition, the unitary inlet valve 77 and outlet valve 78 normally are biased, by a spring 79, to close the inlet port 72.

In operation, the brake control valve 67 normally is closed by the inlet valve 77 so the motor port 73 is in communication, via the T port 80, with the exhaust port 71. When the valve stem 74 is depressed, the T port 80 seats on the outlet valve 78 to seal the lower valve chamber from the exhaust port 71. At the same time, this movement lifts the inlet valve 77 from its seat and admits fluid pressure from the inlet port 72 to the motor port 73 and the brake control conduit 59. When the valve stem 74 is released, the spring 75 returns the valve elements to the position shown in Fig. 7. In this position, the inlet valve 77 once more is seated, the motor port 73 communicates with the exhaust port 71, and the brake 11b is released.

The clutch control valve 66 (see Fig. 8) comprises a unitary casing member 81 having an inlet port 82 communicating with the aforementioned pressure supply tank 14, an exhaust port 83 communicating with atmosphere (if air is the fluid pressure utilized), and a motor port 84 communicating with the clutch via the aforementioned clutch control conduit 36. Within the casing 81, a cylindrical valve 85 is fixed to a slidable valve stem 86 and is biased by the spring 87 normally to interconnect the inlet port 82 and the motor port 84. This normal position of the clutch valve 66 is commensurate with the engagement of the clutch 11a.

In operation, depression of the valve stem 86 will move the valve 85 against the bias of the spring 87 to close the inlet port 82 and open the exhaust port 83. This movement disengages the clutch 11a in much the same manner that the depression of the clutch pedal in an automobile disengages the motor from the wheels. In reverse, when the valve stem 86 is released, the spring 87 causes the valve 85 once more to close the exhaust port 83 and to open the inlet port 82. This latter movement will engage the clutch 11a.

Returning now to the schematic drawing of Fig. 3, it will be seen that the depression of the clutch valve stem 86 is controlled by an eccentric clutch cam 88 and the depression of the brake valve stem 84 is controlled by an eccentric brake cam 89. Both of these cams, in turn, are keyed to the central control column 64 for rotation therewith. Thus, should the driver wish to effect a shallow turn to the left, he need only rotate the steering wheel 65 a slight distance (approximately 20 degrees) until the cam high point 90 engages and depresses the valve stem 86. At this point, the valve 85 closes the clutch inlet port 82 and opens the exhaust port 83 to disengage the clutch 11a. The brake 11b, however, is not applied at this time since the brake cam high point 92 does not engage the brake valve stem 74 until a further rotation is effected.

When the driver wishes to effect a sharp turn to the left, he rotates the steering wheel 65 and central control column 64 a slight distance further (counterclockwise approximately 40 degrees as shown in Fig. 3). This continued rotation causes the brake cam high point 92 to depress the brake valve stem 74 and apply the brake 11b in the manner aforementioned. At the same time, the clutch valve stem 86 continues to ride on the clutch cam high point 90. Thus, the left clutch 11a is disengaged at the same time the left brake 11b is applied. This causes the tractor to pivot sharply to the left.

In Fig. 3, I have illustrated several optional features which may be combined with my inventive control mechanism. The first such feature comprises a master brake valve 93 interconnecting the fluid pressure supply tank 14 and both of the brake mechanisms 11b and 12b. If the driver wishes to set or apply both brakes at the same time, this valve is opened to supply fluid pressure to the brakes 11b and 12b via the common conduit 94.

The second optional feature above mentioned, relates to an enlarged cam high point 91 formed on the clutch cam 88. When the central control column 64 and the cam 88 are rotated approximately 180 degrees from the position shown in Fig. 3, the enlarged high point 91 depresses both of the clutch valve stems simultaneously. Such a movement disengages both of the clutches 11a and 12a to allow the tractor to "free wheel" or coast, if desired.

As a third optional feature, a spring bias detent 95 may be secured to the deck of the tractor adjacent the brake cam 89. In cooperation with this detent, a plurality of apertures 96 may be spaced about the periphery of the brake cam 89. Thus, the peripheral location of the apertures 96 will be correlated to the operative positions of the cam high points 90, 91, and 92, one aperture corresponding to each operative position. For example, the detent 95 is shown engaged in an aperture corresponding to the normal, straight-ahead steering position shown in Fig. 3. A second aperture may correspond to the rotation (approximately 20 degrees) required to effect an actuation of one of the clutches, a third aperture to the rotation required to actuate a clutch and a brake (approximately 60 degrees), and a fourth aperture to the rotation commensurate with the application of both clutches simultaneously (180 degrees).

In summation, my direction control mechanism includes a pair of concentric clutch and brake mechanisms 11 and 12, respectively, joined operatively to the track or ground-engaging portion (the wheels in my preferred embodiment) at each side of the tractor. Each clutch and each brake are pressure actuated through conduits (84 and 73, 59) which carry separate control valves (66 and 67) arranged peripherally about the central control column 64. In addition, two eccentric cams or cam surfaces 88 and 89 are carried for rotation with the column 64 in engagement with the valve stems 86 and 74. By positioning the high points 90 and 92 of the cams 88 and 89 with respect to the angular location of the valve stems, a simple rotation of the control column 64 sequentially will disengage a given clutch and apply the corresponding brake. This sequence, clutch then brake, positively is required. For example, a counterclockwise rotation of the steering wheel 65 (see Fig. 3) sequentially will disengage the left clutch 11a and will apply the left brake 11b. This sequential control bottoms a dual advantage. In the first place, the driver need give but a minimum of attention to steering the tractor, thus freeing his mind for attention to the control of the accessories or secondary work tools. In the second place, the clutch control valve 66 always is actuated before the corresponding brake control valve 67 thereby compelling the driver to effect a correct sequence of action each and every time. This compelled sequence increases materially the life of the clutches and brakes.

Further in service of the objects of my invention, I have provided a concentric clutch and brake mechanism which will effect a material saving in weight and complex operating mechanism while, at the same time, providing a material increase in the strength and operating efficiency of these elements. By combining a novel heat dissipation and radial expansion structure with this concentric brake and clutch mechanism, I have added materially to the trouble-free operation thereof. Yet further, I have provided a separate fluid pressure actuation mechanism for each brake 11b and 12b and for each clutch 11a and 12a. Such pressure fluid actuation amplifies the power available for braking and clutching, an essential factor in the operation of a modern, massive tractor.

I claim:

1. A combination clutch and brake means, comprising a circular brake drum concentric with and surrounding a circular friction clutch, said drum and clutch being joined for rotation about a common axis by an expansion means to accommodate differential radial expansion therebetween, said expansion means including a spaced plurality of mated tooth and socket elements arranged in a circular pattern intermediate said concentric brakes and clutch, said socket elements being larger than said tooth elements to accommodate said radial expansion, and a plurality of axial air ducts parallel said common axis and intermediate each said brake drum and clutch to cool the parts thereof during operation.

2. In combination with a circular friction clutch having a driving and a driven element, a rotatable drive shaft fixed to said driving element, a rotatable driven shaft aligned with said drive shaft and fixed to said driven element, one of said clutch elements being movable laterally with respect to the other selectively to engage and disengage said drive and driven shafts, a circular brake drum surrounding said circular clutch and concentric therewith, and radial expansion means for fixing said brake drum to said driving element in spaced peripheral relationship therewith, said expansion means including a plurality of mated tooth and socket elements, and a plurality of axial air ducts each opening to the atmosphere at both ends thereof, and bounded peripherally between spaced ones of said tooth and socket elements and bounded radially between said brake drum and said driven element.

3. In combination with a friction clutch having a driving and a driven element, a rotatable drive shaft fixed to said driving element, a rotatable driven shaft aligned with said drive shaft and fixed to said driven element, one of said clutch elements being movable laterally with respect to the other selectively to engage and disengage said drive and driven shafts, a brake drum surrounding said clutch and concentric therewith, radial expansion means for fixing said brake drum to said driven element in spaced peripheral relationship therewith, said expansion means including a plurality of mated tooth and socket elements, a plurality of axial air ducts bounded peripherally between spaced ones of said tooth and socket elements and bounded radially between said brake drum and said driven element, and a pressure-actuated piston and cylinder means bearing on said driven element frictionally to engage said two clutch elements one with another, said last mentioned means lying wholly radially inwardly of said pair of ducts.

4. In combination with a friction clutch having a driving and a driven element, a rotatable drive shaft fixed to said driving element, a rotatable driven shaft aligned with said drive shaft and fixed to said driven element, one of said clutch elements being movable laterally with respect to the other selectively to engage and disengage said drive and driven shafts, a brake drum surrounding said clutch and concentric therewith, radial expansion means for fixing said brake drum to said driven element in spaced peripheral relationship therewith, a pressure actuated piston and cylinder means bearing on said driven element frictionally to engage said two clutch elements one with another, and a plurality of air ducts arranged intermediate said brake and clutch, said piston and cylinder means lying wholly radially inwardly of said air ducts, said pressure actuated means including a pressure supply and exhaust conduit carried by said driven shaft in axial alignment with the axis of rotation thereof.

References Cited in the file of this patent

UNITED STATES PATENTS

| 1,418,747 | Townsend | June 6, 1922 |
| 1,474,742 | Turnbull | Nov. 23, 1923 |
| 1,730,492 | Aumack | Oct. 8, 1929 |
| 2,002,367 | Fahrney | May 21, 1935 |
| 2,178,280 | Hutchins | Oct. 31, 1939 |
| 2,338,101 | Ellinwood | Jan. 4, 1944 |
| 2,384,182 | Lewis | Sept. 4, 1945 |
| 2,503,755 | Martin et al. | Apr. 11, 1950 |
| 2,539,545 | Ljungkull | Jan. 30, 1951 |
| 2,615,542 | Le Tourneau | Oct. 28, 1952 |

FOREIGN PATENTS

| 440,160 | Great Britain | Dec. 20, 1935 |